(12) United States Patent
Choi et al.

(10) Patent No.: US 11,255,974 B2
(45) Date of Patent: Feb. 22, 2022

(54) METHOD OF DETERMINING POSITION OF VEHICLE AND VEHICLE USING THE SAME

(71) Applicant: SAMSUNG ELECTRONICS CO., LTD., Suwon-si (KR)

(72) Inventors: Mideum Choi, Suwon-si (KR); Changsoo Park, Suwon-si (KR); Aron Baik, Suwon-si (KR); Jewoong Ryu, Suwon-si (KR); Inhak Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 163 days.

(21) Appl. No.: 16/396,799

(22) Filed: Apr. 29, 2019

(65) Prior Publication Data

US 2019/0332120 A1    Oct. 31, 2019

(30) Foreign Application Priority Data

Apr. 27, 2018  (KR) .................. 10-2018-0049095

(51) Int. Cl.
*G01S 17/89* (2020.01)
*G05D 1/02* (2020.01)
(Continued)

(52) U.S. Cl.
CPC ............ *G01S 17/89* (2013.01); *B60W 40/06* (2013.01); *G01C 21/32* (2013.01); *G01S 17/931* (2020.01);
(Continued)

(58) Field of Classification Search
None
See application file for complete search history.

(56) References Cited

U.S. PATENT DOCUMENTS 9,612,123 B1 *  4/2017  Levinson .............. B60W 30/09
9,940,527 B2    4/2018  Lee et al.
(Continued)

FOREIGN PATENT DOCUMENTS

JP    2005-265494 A    9/2005
JP        5714940        5/2015
(Continued)

OTHER PUBLICATIONS

International Search Report and Written Opinion dated Aug. 7, 2019, issued in International Application No. PCT/KR2019/005028.
(Continued)

*Primary Examiner* — Dale W Hilgendorf
*Assistant Examiner* — Alexander C. Bost
(74) *Attorney, Agent, or Firm* — Nixon & Vanderhye P.C.

(57) ABSTRACT

Provided is an autonomous vehicle including a storage configured to store a map including two-dimensionally represented road surface information and three-dimensionally represented structure information, a camera configured to obtain a two-dimensional (2D) image of a road surface in a vicinity of the vehicle, a light detection and ranging (LiDAR) unit configured to obtain three-dimensional (3D) spatial information regarding structures in a vicinity of the vehicle, and a controller comprising processing circuitry configured to determine at least one of the camera or the LiDAR unit as a position sensor, based on whether it is possible to obtain information regarding the road surface and/or the structures in the vicinity of the vehicle, to identify a position of the vehicle on the map corresponding to a current position of the vehicle using the position sensor, and performing autonomous driving based on the identified position on the map.

15 Claims, 17 Drawing Sheets

(51) Int. Cl.
  *G01C 21/32* (2006.01)
  *B60W 40/06* (2012.01)
  *G06F 16/29* (2019.01)
  *G01S 17/931* (2020.01)

(52) U.S. Cl.
  CPC ........... *G05D 1/024* (2013.01); *G05D 1/0274* (2013.01); *G06F 16/29* (2019.01); *G05D 2201/0213* (2013.01)

(56) References Cited

U.S. PATENT DOCUMENTS

| | | | |
|---|---|---|---|
| 10,724,865 B1* | 7/2020 | Ferguson | G01S 7/484 |
| 2009/0265070 A1* | 10/2009 | Okada | B60W 50/0098 |
| | | | 701/70 |
| 2012/0150437 A1* | 6/2012 | Zeng | G01C 21/30 |
| | | | 701/456 |
| 2014/0121880 A1 | 5/2014 | Dolgov et al. | |
| 2015/0025708 A1 | 1/2015 | Anderson | |
| 2015/0378015 A1 | 12/2015 | You et al. | |
| 2016/0012754 A1 | 1/2016 | Kishikawa et al. | |
| 2016/0146618 A1* | 5/2016 | Caveney | B60W 50/14 |
| | | | 701/25 |
| 2016/0161265 A1* | 6/2016 | Bagheri | G01S 13/89 |
| | | | 701/450 |
| 2016/0363647 A1 | 12/2016 | Zeng et al. | |
| 2016/0377437 A1 | 12/2016 | Brannstrom et al. | |
| 2017/0023659 A1 | 1/2017 | Bruemmer et al. | |
| 2017/0241794 A1 | 8/2017 | Koo et al. | |
| 2017/0263014 A1 | 9/2017 | Kuznetsov et al. | |
| 2017/0307743 A1* | 10/2017 | Izzat | G06K 9/00805 |
| 2018/0045519 A1* | 2/2018 | Ghadiok | G06K 9/2054 |
| 2018/0058861 A1* | 3/2018 | Doria | G01S 7/4808 |
| 2018/0060725 A1 | 3/2018 | Groh et al. | |
| 2018/0188038 A1* | 7/2018 | Yang | B60W 40/06 |
| 2018/0188742 A1* | 7/2018 | Wheeler | G08G 1/0141 |
| 2018/0204347 A1* | 7/2018 | Stenborg | G06K 9/628 |
| 2018/0210087 A1* | 7/2018 | Olson | G01S 17/89 |
| 2018/0268566 A1* | 9/2018 | Houts | G06T 7/74 |
| 2018/0308250 A1* | 10/2018 | Li | G01S 7/4808 |
| 2018/0349746 A1* | 12/2018 | Vallespi-Gonzalez | |
| | | | G01S 17/89 |
| 2018/0364366 A1* | 12/2018 | Cvijetic | G01S 19/07 |
| 2019/0066344 A1* | 2/2019 | Luo | G06K 9/6215 |
| 2019/0101649 A1* | 4/2019 | Jensen | G05D 1/0278 |
| 2019/0138823 A1* | 5/2019 | Doria | G06T 7/521 |
| 2019/0189006 A1 | 6/2019 | Toma et al. | |
| 2019/0219404 A1* | 7/2019 | Ahn | G01C 21/30 |
| 2019/0219697 A1* | 7/2019 | Castorena Martinez | |
| | | | G01S 17/931 |
| 2019/0234745 A1* | 8/2019 | Lee | G05D 1/0055 |
| 2019/0265050 A1* | 8/2019 | Fujimoto | G09B 29/10 |
| 2019/0311546 A1* | 10/2019 | Tay | G06T 19/006 |
| 2020/0098135 A1* | 3/2020 | Ganjineh | G06F 16/583 |

FOREIGN PATENT DOCUMENTS

| | | |
|---|---|---|
| KR | 10-2015-0132178 | 11/2015 |
| KR | 10-1613849 | 4/2016 |
| KR | 10-2016-0059376 | 5/2016 |
| WO | WO 2018/038131 | 3/2018 |

OTHER PUBLICATIONS

Extended European Search Report dated Mar. 16, 2021 for EP Application No. 19792482.2.

Korean Office Action dated Oct. 21, 2021 for KR Application No. 10-2018-0049095.

* cited by examiner

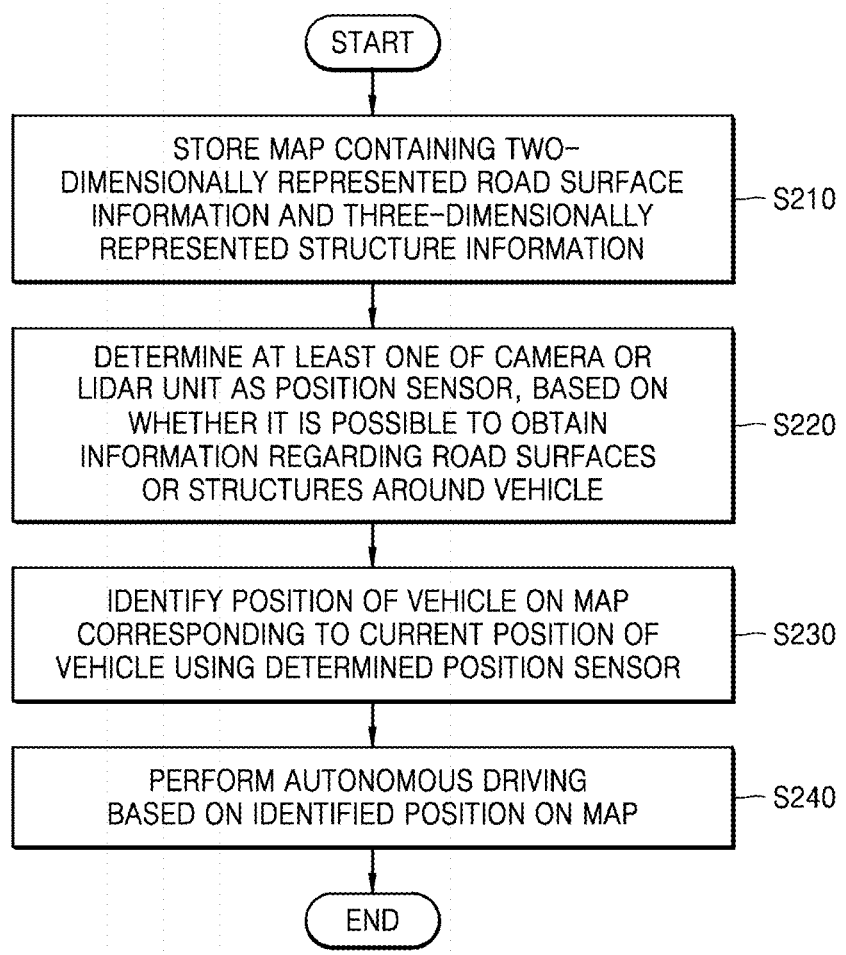

METHOD OF DETERMINING POSITION OF VEHICLE AND VEHICLE USING THE SAME

CROSS-REFERENCE TO RELATED APPLICATION

This application is based on and claims priority under 35 U.S.C. § 119 to Korean Patent Application No. 10-2018-0049095, filed on Apr. 27, 2018, in the Korean Intellectual Property Office, the disclosure of which is incorporated by reference herein in its entirety.

BACKGROUND

1. Field

The disclosure relates to a method of determining a position of a vehicle and a vehicle using the same, and for example, to a method of determining a position of a vehicle on a navigation map during autonomous driving, and a vehicle using the same.

2. Description of Related Art

A map for autonomous driving may be a map which contains information regarding roads and the surrounding terrain and through which geographical features are identified within an error range of 1020 cm or less. In one example, the map for autonomous driving may be referred to as a precision digital map, a high-precision digital map, or a live map.

Maps for autonomous driving are at least ten times more accurate than existing electronic maps, and three-dimensionally represent the elevation of the terrain, the curvature radius and curvature of the road, and surroundings. In detail, a map for autonomous driving may accurately express each point of an object with three-dimensional (3D) coordinates.

A map for autonomous driving may further include information regarding not only lanes but also the positions of traffic control lines, such as a center lane, a boundary line of the road, a center line of the road, and a stop line, information regarding the position of road facilities such as median strips, tunnels, bridges, and underpasses, and information regarding the locations of landmark facilities, such as traffic safety signs, road signs, and signaling devices. A map for autonomous driving may further include dynamic information such as real-time road conditions and the positions of moving objects such as vehicles and people, as well as static information such as the positions of geographic features and traffic control lines.

An autonomous vehicle is capable of calculating its position on a map corresponding to its current position using a position sensor, and performing autonomous driving based on the calculated position.

SUMMARY

Provided are various example embodiments for determining a position of a vehicle on a map by selectively using a camera and Light Detection And Ranging (LiDAR), based on surroundings or a driving situation of the vehicle.

Provided are various example embodiments of a map for autonomous navigation, in which two-dimensional (2D) information and three-dimensional (3D) information are combined.

Additional example aspects will be set forth in part in the description which follows and, in part, will be apparent from the description.

According to an example embodiment of the disclosure, an autonomous vehicle includes a storage storing a map including two-dimensionally represented road surface information and three-dimensionally represented structure information, a camera configured to obtain a two-dimensional (2D) image of a road surface in a vicinity of the vehicle; a light detection and ranging (LiDAR) unit comprising LiDAR circuitry configured to obtain three-dimensional (3D) spatial information regarding structures proximate the vehicle, and a controller configured to determine at least one of the camera and/or the LiDAR unit as a position sensor, based on whether it is possible to obtain information regarding the road surface and/or the structures around the vehicle, to identify a position of the vehicle on the map corresponding to a current position of the vehicle using the position sensor, and to control the autonomous vehicle to perform autonomous driving based on the identified position on the map.

When the camera is determined as a position sensor, the controller may be further configured to identify the position of the vehicle on the map corresponding to the current position of the vehicle using the camera to obtain the 2D image of the road surface in a vicinity of the vehicle and by mapping information regarding lanes and/or a road surface included in the 2D image to the two-dimensionally represented road surface information included in the map.

When the LiDAR unit is determined as a position sensor, the controller may be further configured to identify the position of the vehicle on the map corresponding to the current position of the vehicle using the LiDAR unit to obtain the 3D spatial information regarding the structures in a vicinity of the vehicle and by mapping the 3D spatial information to the 3D structure information included in the map.

The controller may be further configured to determine whether it is possible to obtain information regarding the road surface and/or the structures in a vicinity of the vehicle by determining whether there are lanes and/or road surface signs on a road surface in a vicinity of the vehicle on the map and/or whether there are structures in a vicinity of the vehicle on the map.

The controller may be further configured to determine whether it is possible to obtain information regarding the road surface in a vicinity of the vehicle by determining whether it is possible to obtain information regarding lanes and/or road surface signs on the road surface from the 2D image of the road surface in a vicinity of the vehicle obtained by the camera.

The controller may be further configured to determine the LiDAR unit as a position sensor, based on determining that there are no lanes and/or road surface signs on a road surface on the map corresponding to the vicinity of the vehicle.

The controller may be further configured to determine the LiDAR unit as a position sensor, based on determining that it is not possible to obtain information regarding lanes and/or road surface signs on the road surface from the 2D image.

The controller may be further configured to determine whether structures capable of being sensed by the LiDAR unit are located in a vicinity of the vehicle, based on the map, and to determine the camera as a position sensor based on determining that there are no structures in the vicinity of the vehicle.

The controller may be further configured to determine both the camera and the LiDAR unit as position sensors, based on it being possible to obtain both information regarding the road surface around the vehicle and information regarding the structures around the vehicle and when a driving situation of the vehicle includes changing lanes, turning, and/or making a U-turn.

The map may be a map in which information regarding a reliability index representing a degree of reliability of each object in the map is determined, and the controller may be further configured to identify the position of the vehicle on the map corresponding to the current position of the vehicle, based on the reliability index of each object in the map.

BRIEF DESCRIPTION OF THE DRAWINGS

The above and other aspects, features, and advantages of certain example embodiments of the disclosure will be more apparent from the following detailed description, taken in conjunction with the accompanying drawings, in which:

FIG. 2 is a flowchart illustrating an example method of identifying a position of a vehicle on a map by selectively using a camera or a Light Detection And Ranging (LiDAR) sensor, based on surroundings of the vehicle, the method being performed by the vehicle, according to an example embodiment of the disclosure;

DETAILED DESCRIPTION

The terms used herein will be briefly described and the disclosure will be described in detail.

In the disclosure, general terms that have been widely used are selected, when possible, in consideration of functions of the disclosure, but non-general terms may be selected according to the intentions of technicians in the art, precedents, new technologies, etc. Some terms may be arbitrarily chosen by the applicant. In this case, the meanings of these terms will be explained in corresponding parts of the disclosure. Accordingly, the terms used herein should be defined not based on the names thereof but based on the meanings thereof and the context of the entire disclosure.

It will be understood that the terms "comprises" and/or "comprising," when used in this disclosure, specify the presence of stated elements, but do not preclude the presence or addition of one or more other elements. As used herein, the term "module" or "unit" may be implemented in combination of one or more among software, hardware, firmware or any combinations thereof. Throughout the disclosure, the expression "a, b or c" may, for example, indicate only a, only b, only c, both a and b, both a and c, both b and c, all of a, b, and c, (e.g., a, b and/or c) or any variations thereof.

Throughout the disclosure, three-dimensional (3D) information included in a map may refer, for example, to map information representing an actual area or object with 3D coordinates.

Throughout the disclosure, two-dimensional (2D) information included in a map may refer, for example, to map information representing information displayed on an actual area or object. The information displayed on an object may refer to, but is not limited to, text, numbers, a shape, and/or a color displayed on the object. The 2D information may, for example, and without limitation, be an image represented similar to a color and shape displayed on an actual object and information regarding the object, may be an image generated by enlarging, reducing, and/or rotating an actual image captured by a camera, or the like.

Figure 1:
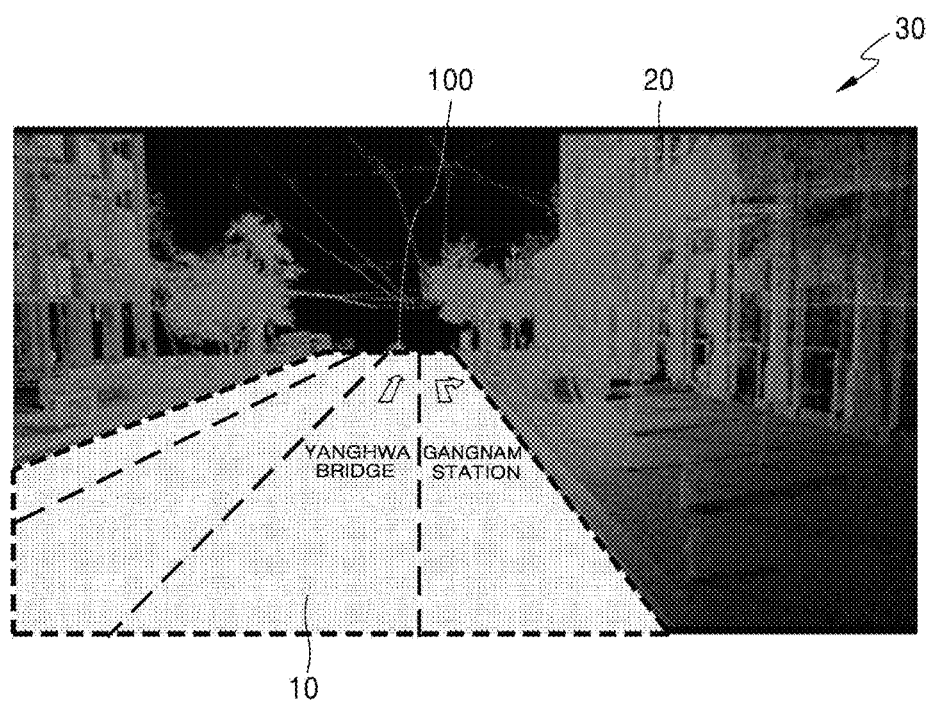
FIG. 1 is a diagram illustrating an example method of determining a position of a vehicle on a map, the method being performed by the vehicle, according to an example embodiment of the disclosure.

FIG. 1 is a diagram illustrating an example method of determining a position of a vehicle 100 on a map, the method being performed by the vehicle 100, according to an example embodiment of the disclosure The vehicle 100 may be capable of precisely calculating a position thereof on a map corresponding to a current position thereof by mapping information obtained by a position sensor and information of the map for autonomous driving. In an example embodiment of the disclosure, a process of identifying the position of the vehicle 100 on the map may be referred to as localization.

Examples of the position sensor may include, but are not limited to, a Light Detection And Ranging (LiDAR) unit (e.g., including LiDAR circuitry), a camera, radar, a Global Positioning System (GPS), a gyroscope, an ultrasonic wave sensor, or the like.

The GPS may, for example, be a satellite navigation system calculating the current position of the vehicle 100 by receiving signals transmitted from a GPS satellite. The vehicle 100 may accurately identify the position thereof by identifying a seed position using a GPS and mapping information regarding surroundings of the vehicle 100 obtained using a camera and/or a LiDAR unit to the map, based on the seed position.

Radar may, for example, detect the speed of an object adjacent thereto and the distance to the object by outputting a radio wave and measuring a time required to receive a radio wave reflected from the object and a frequency deviation. Radar may, for example, be classified into long-range radar and medium/short-range radar according to functions thereof. For example, the long-range radar may be used for automatic adjustment of the distance to a car in front of the vehicle 100, and the medium/short-range radar may be used for emergency braking and/or blind zone alarms.

The LiDAR unit may include various LiDAR circuitry and obtain information regarding a distance to an object by outputting a pulsed laser beam and measuring a time required to receive a laser beam reflected from the object. Thus, the vehicle 100 may generate a 3D map of not only objects close thereto but also objects distant therefrom using the LiDAR unit. Although the distance to an object near the vehicle 100 may be identified by radar, the LiDAR unit may use a laser beam of a short wavelength and the resolution and precision of an image of the object represented by the LiDAR unit are accordingly high and thus may be suitable for 3D map mapping.

The vehicle 100 may identify the position thereof on a 3D map corresponding to a current position thereof by obtaining information regarding the shapes of and the distances to objects near (e.g., in a vicinity of) the vehicle 100 by the LiDAR unit and comparing the obtained information with the 3D map. The term vicinity as used herein may refer, for example, to a determined area and/or distance from and/or surrounding the vehicle.

However, it may be difficult for the vehicle 100 to identify information displayed on an object, such as information displayed on a lane, a signal, or the like, by the LiDAR unit and may identify the position of the vehicle 100 on a 2D map corresponding to the current position of the vehicle 100 by comparing information obtained by the LiDAR unit of the vehicle 100 with the 2D map. In addition, the LiDAR unit consumes a large amount of power and may be difficult to use for a long time.

The vehicle 100 may obtain a 2D image of surroundings thereof by the camera, and identify an object and information displayed on the object from the 2D image. Thus, the vehicle 100 may obtain information regarding lanes, signs, or the like, on the road by the camera. However, the camera may have difficulty identifying information regarding a distance to an object, and a processing speed thereof may be decreased due to a large amount of calculation even when the object is three-dimensionally identified by the camera. Therefore, it may be difficult for the vehicle 100 to identify the position thereof on a 3D map corresponding to a current position of the vehicle 100 by comparing information obtained by the camera with the 3D map.

Referring to FIG. 1, according to an example embodiment of the disclosure, the vehicle 100 may store a map 30, for autonomous navigation, which includes two-dimensionally represented road surface information 10 and three-dimensionally represented structure information 20.

For example, in the map for autonomous driving, the road surface information 10 may be represented two-dimensionally and the structure information 20 regarding regions other than a road surface may be represented three-dimensionally. The road surface may refer, for example, and without limitation, to a roadway, and the regions other than the road surface may include, for example, and without limitation, a curb separating the road and a sidewalk from each other, the sidewalk, a building, a tree, a human being, or the like, but are not limited thereto. The road, lanes, a speed limit sign, a direction sign, a destination sign, or the like, may be displayed on the road surface.

The 2D road surface information 10 may include, for example, and without limitation, information generated by enlarging, reducing and/or rotating an actual image captured by a camera, or the like. In this example, as a similarity between the 2D road surface information 10 and an image of the road surface captured by the camera is higher, the vehicle 100 may map a 2D image obtained from the camera and the 2D road surface information 10 in the map 30 more easily, quickly, and accurately.

The 3D structure information 20 may be 3D information obtained by the LiDAR unit. The 3D structure information 20 may be expressed, for example, and without limitation, in the form of a point cloud map, a grid map, or the like, but is not limited thereto. The 3D structure information 20 may include information regarding the shapes of objects and the distances to the objects.

The vehicle 100 may identify a position thereof on the map 30 corresponding to the current position of the vehicle 100 by selectively referring to the 2D road surface information 10 and the 3D structure information 20 or referring to both the 2D road surface information 10 and the 3D structure information 20, based on information regarding surroundings of the vehicle 100.

For example, the vehicle 100 may identify the position thereof on the map 30 corresponding to the current position of the vehicle 100 by obtaining an image of a road surface near (e.g., in the vicinity of) the vehicle 100 using the camera and mapping the obtained image of the road surface to the 2D road surface information 10.

When there are many other vehicles 100 around (e.g., in the vicinity of) the vehicle 100, the vehicle 100 may not be capable of obtaining an image of a road surface around the vehicle 100. When information displayed on the road cannot be viewed due, for example, to snow or rain, the vehicle 100 may not obtain an accurate image of the road surface. In case of a non-paved road, no information may be displayed on the road surface. In this example, the vehicle 100 may identify the position thereof on the map 30 corresponding to the current position of the vehicle 100 by identifying the shape or the position of a structure near the vehicle 100 by the LiDAR unit and mapping the identified information to the 3D structure information 20.

In addition, there may be no structures around the vehicle 100 on a highway located in a plain area. In this example, the vehicle 100 may identify the position thereof on the map 30 corresponding to the current position of the vehicle 100 by obtaining an image of a road surface around the vehicle 100 by the camera and mapping the obtained image of the road surface to the 2D road surface information 10.

When it is determined that it is important to accurately identify a pose or position of the vehicle 100 in real time, the vehicle 100 may more accurately identify the position thereof on the map 30 by obtaining information regarding an image of a road surface around the vehicle 100 and information regarding the structures and positions of structures around the vehicle 100 using both the camera and the LiDAR unit and mapping the obtained information to the 2D road surface information 10 and the 3D structure information 20. For example, the vehicle 100 may use both the camera and the LiDAR unit to change lanes.

Only the camera, only the LiDAR unit, or both the camera and the LiDAR unit may be used according to a user input.

FIG. 2 is a flowchart illustrating an example method of identifying a position of the vehicle 100 on a map by selectively using a camera and a LiDAR unit, based on surroundings of the vehicle, the method being performed by the vehicle 100, according to an example embodiment of the disclosure.

In operation S210, the vehicle 100 may store a map containing two-dimensionally represented road surface information and three-dimensionally represented structure information.

Existing maps for autonomous driving may be maps such as 2D maps or 3D maps. A 2D map for autonomous driving may be configured based on images captured by a camera. A 3D map for autonomous driving may be configured based on 3D information obtained by the LiDAR unit.

In some example embodiments of the disclosure, the vehicle 100 may create a map for autonomous driving, in which road surfaces are two-dimensionally represented and structures are represented three-dimensionally using both a camera and a LiDAR unit. A method of creating a map including 2D road surfaces and 3D structures using a camera and a LiDAR unit, the method being performed by the vehicle 100, will be described in greater detail below with reference to FIGS. 3A and 3B.

The vehicle 100 may create a map and/or may receive a map from an external server.

In operation S220, the vehicle 100 may determine the camera or a LiDAR unit as a position sensor, based on whether it is possible to obtain information regarding road surfaces or structures around (e.g., in the vicinity of) the vehicle 100.

The vehicle 100 may determine the LiDAR unit as a position sensor when information regarding road surfaces around the vehicle 100 cannot be obtained. The vehicle 100 may determine the camera as a position sensor when information regarding structures around the vehicle 100 cannot be obtained.

When lanes or a road surface is not displayed around the vehicle 100 on the map, the vehicle 100 may identify (e.g., determine) that no lanes or road surface sign is displayed on an actual road surface around the vehicle 100 and thus information regarding the road surface of the vehicle 100 cannot be obtained.

The vehicle 100 may identify whether it is possible to obtain information regarding lanes or a road surface sign displayed on a road surface from a 2D image of a road surface around the vehicle 100 which is obtained from the camera, and may identify that information regarding the road surface around the vehicle 100 cannot be obtained when lanes or road signs are hidden by other objects and thus are not identified from the 2D image of the road surface due to the lanes or road surface sign.

When structures are not displayed around the vehicle 100 on the map, the vehicle 100 may identify that there are actually no structures around the vehicle 100 and thus information regarding structures around the vehicle 100 cannot be obtained.

When information regarding both road surfaces and structures around the vehicle 100 may be obtained and a driving situation of the vehicle 100 is a predetermined driving situation that needs an accurate pose or position of the vehicle 100 to be identified, the vehicle 100 may more quickly and accurately identify the position thereof on the map by determining both the camera and the LiDAR unit as position sensors, mapping a 2D image of road surfaces obtained from the camera to the 2D road surface information in the map, and mapping 3D information obtained by the LiDAR unit to the 3D structure information in the map. The predetermined driving situation may include, for example, changing lanes, making a left turn, making a right turn, making a U-turn, or the like, but is not limited thereto.

In operation S230, the vehicle 100 may identify the position thereof on the map corresponding to a current position thereof using the position sensor.

For example, when the camera is determined as a position sensor, the vehicle 100 may identify the position thereof on the map corresponding to the current position of the vehicle 100 by obtaining a 2D image of a road surface around the vehicle 100 using the camera and mapping information regarding lanes or road surfaces contained in the 2D image to the 2D road surface information contained in the map.

For example, the vehicle 100 may identify the position thereof on the map corresponding to the current position of the vehicle 100 by detecting feature points of lanes from the 2D image and mapping the feature points to the 2D road surface information.

When the LiDAR unit is determined as a position sensor, the vehicle 100 may identify the position thereof on the map corresponding to the current position thereof by obtaining 3D spatial information regarding structures around the vehicle 100 by the LiDAR unit and mapping the 3D spatial information to the 3D structure information in the map.

For example, the vehicle 100 may identify the position thereof on the map corresponding to the current position of the vehicle 100 by detecting feature points of the corners of a building from the 3D spatial information and mapping the feature points to the 3D spatial information.

In operation S240, the vehicle 100 may perform autonomous driving based on the identified position thereof on the map.

The vehicle 100 may identify a direction of movement thereof or a next operation thereof, based on the position thereof on the map.

Figure 3A:
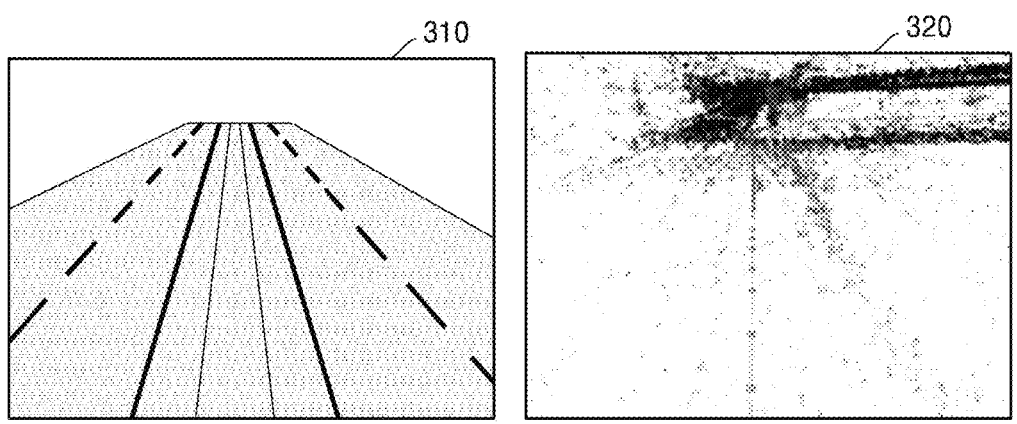
FIG. 3A is a diagram illustrating an example method of creating a map for autonomous driving, the method being performed by a vehicle, according to an example embodiment of the disclosure.
Figure 3B:
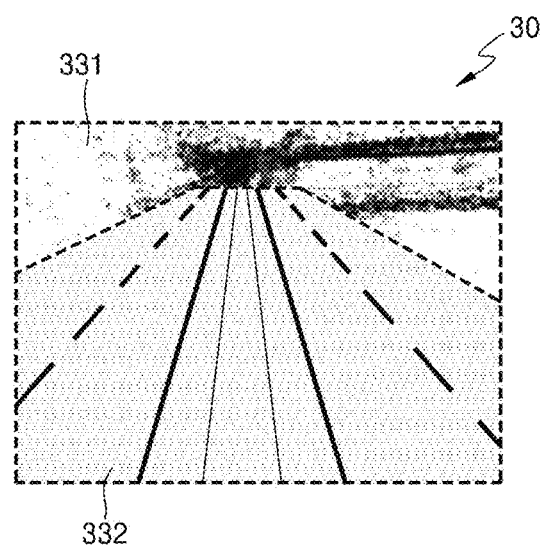
FIG. 3B is a diagram illustrating an example method of creating a map for autonomous driving, the method being performed by a vehicle, according to another example embodiment of the disclosure.

FIGS. 3A and 3B are diagrams illustrating example methods of creating a map for autonomous driving, the methods being performed by a vehicle, according to example embodiments of the disclosure.

Referring to FIG. 3A, the vehicle 100 may create a map 310 represented two-dimensionally. For example, while driving, the vehicle 100 may obtain a 2D image of objects around the vehicle 100 using the camera thereof and create the 2D map 310, based, for example, and without limitation, on a driving distance, an angle, the obtained 2D image, or the like.

Furthermore, the vehicle 100 may create a map 320 represented three-dimensionally. For example, while driving, the vehicle 100 may obtain 3D information regarding objects around the vehicle 100 using the LiDAR unit thereof and create the 3D map 320, based, for example, and without limitation, on a driving distance, an angle, the obtained 3D information, or the like. The 3D map 320 may be a point cloud map in which the positions of the objects identified by the LiDAR unit are represented with a plurality of points as illustrated in FIG. 3A. The 3D map 320 may be a map in which the positions of the objects are represented with voxels but is not limited thereto.

With the 2D map 310 represented two-dimensionally, information displayed on a road surface or an object may be accurately represented but information regarding a distance to the object is difficult to identify by the camera and thus the position of the object may not be accurately represented. Furthermore, feature points are likely to be erroneously detected due, for example, to an illumination environment or a shadow.

With the 3D map 320 represented three-dimensionally, information regarding a distance to an object may be accurately represented and erroneous detection of feature points due, for example, to an illumination environment or a shadow may be reduced, but information displayed on a road surface or an object may not be accurately represented.

Referring to FIG. 3B, the vehicle 100 may create a map 30 in which a road surface 332 is two-dimensionally represented and structures 331 other than the road surface 332 are three-dimensionally represented.

For example, while driving, the vehicle 100 may obtain 3D information regarding structures around the vehicle 100 by the LiDAR unit while obtaining a 2D image of a road surface around the vehicle 100 using the camera, and create the map 30 two-dimensionally representing the road surface 332 and three-dimensionally representing the structures 331, based, for example, and without limitation, on a driving distance, an angle, the 2D image of the road surface, the 3D information regarding the structures, or the like.

When scales of the 2D map 310 represented two-dimensionally and the 3D map 320 represented three-dimensionally are the same, the vehicle 100 may refer to information regarding road surfaces from the 2D map 310 represented two-dimensionally and refer to information regarding structures from the 3D map 320 represented three-dimensionally.

To make the scales of the 2D map 310 and the 3D map 320 the same, it may be necessary for the vehicle 100 to generate both 2D information regarding a road surface and 3D information regarding structures at each position in a driving route during creation of a map. To this end, it may be necessary for the vehicle 100 to simultaneously obtain 2D information regarding the road surface and 3D information regarding the structure at each position in the driving route using both the camera and the LiDAR unit during the creation of the map.

Accordingly, the vehicle 100 may create the map 30 two-dimensionally representing the road surface 332 and three-dimensionally representing the structure 331 without additionally creating the 2D map 310 represented two-dimensionally and the 3D map 320 represented three-dimensionally.

For example, the vehicle 100 may periodically generate a node whenever the vehicle 100 moves in the driving route, and store sensor data obtained from each node to correspond to the node. Examples of information regarding the sensor data may include, but are not limited to, GPS information, inertial measurement unit (IMU) information, camera information, LiDAR information, or the like.

As the sensor data is stored, the vehicle 100 may distinguish a road area and a non-road area from an image obtained from the camera. In addition, the vehicle 100 may distinguish a road area and a non-road area from 3D information obtained by the LiDAR unit.

Thereafter, the vehicle 100 may generate an initial pose graph using the data stored to correspond to each node. For example, the vehicle 100 may generate a pose graph by, for example, and without limitation, a scan matching method, a feature matching method, or the like. The vehicle 100 may precisely calculate (e.g., determine) a pose of the vehicle 100 by optimizing the generated pose graph. The pose of the vehicle 100 may, for example, represent a moving distance and angle of the vehicle 100. The vehicle 100 may create a map 30 including 2D road surface information and 3D structure information, based on the data stored to correspond to each node and the calculated pose.

Figure 4A:
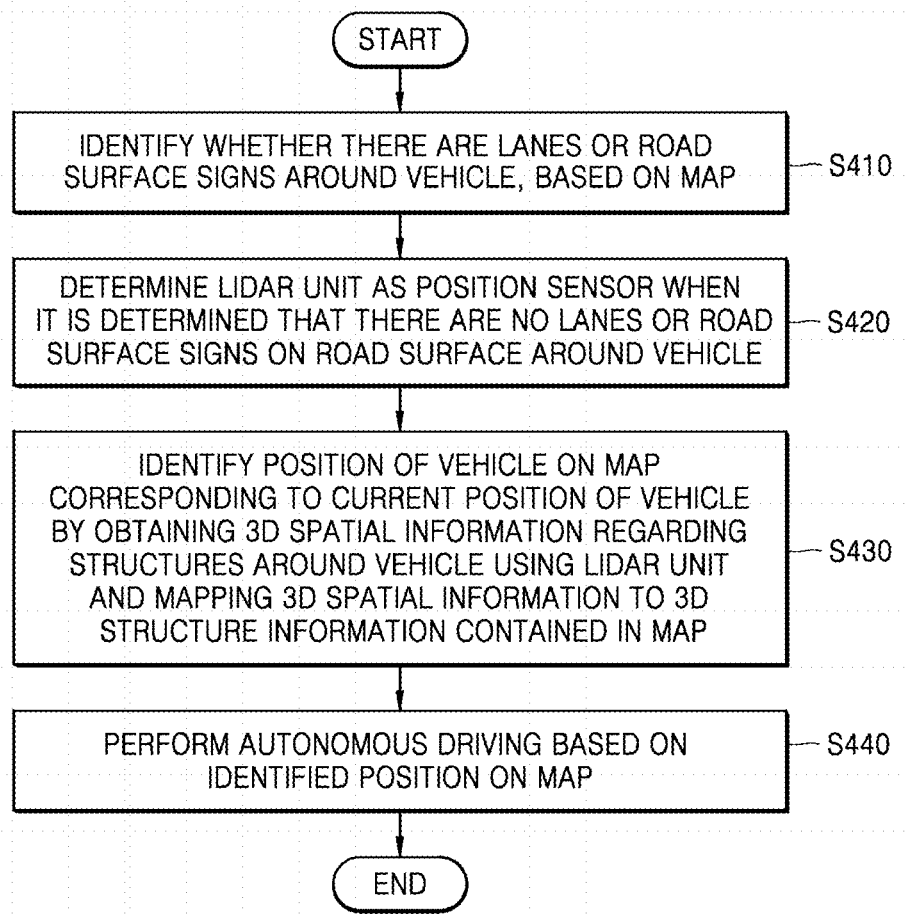
FIG. 4A is a flowchart illustrating an example method of identifying a position of a vehicle when information regarding lanes or a road surface cannot be obtained from a road surface on a map, the method being performed by the vehicle, according to an example embodiment of the disclosure.
Figure 4B:
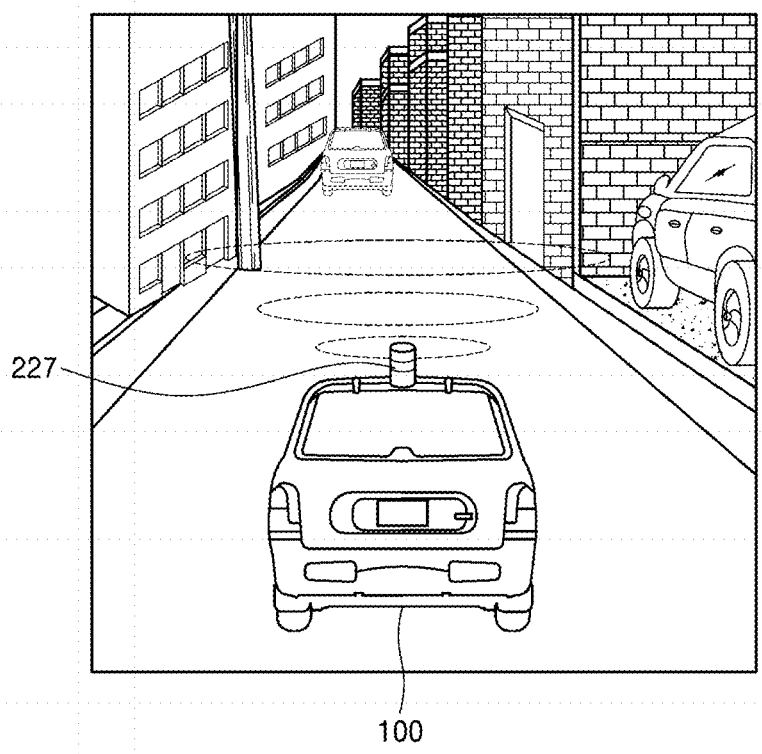
FIG. 4B is a diagram illustrating an example method of identifying a position of a vehicle when information regarding lanes or a road surface cannot be obtained from a road surface on a map, the method being performed by the vehicle, according to an example embodiment of the disclosure.

FIGS. 4A and 4B are a flowchart and diagram, respectively, illustrating an example method of identifying a position of a vehicle 100 when information regarding lanes or road surfaces cannot be obtained from a road surface on a map, the method being performed by the vehicle 100, according to an example embodiment of the disclosure.

Referring to FIG. 4A, in operation S410, the vehicle 100 may identify whether there are lanes or a road surface sign around the vehicle 100, based on a map.

The vehicle 100 may identify a current position thereof using only the camera other than the LiDAR unit. For example, when the camera is set as a default position sensor, the vehicle 100 may identify the current position thereof using only the camera. Because power consumption of the LiDAR unit is high, power consumption of a battery of the vehicle 100 may be increased. Accordingly, the vehicle 100 may identify the current position thereof using only the camera when a remaining power level of the battery is equal to or less than a reference level.

The vehicle 100 may obtain map information regarding road surfaces around the vehicle 100, based on the current position thereof. The road surface around the vehicle 100 may be, for example, in a radius of 3 meters from a point at which the vehicle 100 is located but may be shorter or longer than 3 meters. The road surface around the vehicle 100 may be determined based on the position of the camera mounted on the vehicle 100 or a viewing angle of the camera. For example, when the camera is located near a windshield of the vehicle 100, the road surface around the vehicle 100 may be a road surface 4 meters ahead from the vehicle 100.

The vehicle 100 may identify whether there are lanes or a road surface sign on the road surface around the vehicle 100, based on the map information regarding the road surfaces around the vehicle 100. When the vehicle 100 is located on an alley or an unpaved road, there may be no lanes or road surface sign on the road surface.

In operation S420, the vehicle 100 may determine the LiDAR unit as a position sensor when it is determined that there are no lanes or road surface sign on the road surface around the vehicle 100.

When there are no lanes or road surface sign on the road surface around the vehicle 100, the vehicle 100 cannot obtain information for identifying the current position thereof from an image obtained from the camera. Thus, the vehicle 100 may identify the current position thereof by the LiDAR unit when it is determined that there are no lanes or road surface sign on the road surface around the vehicle 100.

For example, referring to FIG. 4B, when entering an alley from the road, the vehicle 100 may identify that there is no lanes or road surface sign on the road surface and control a LiDAR unit 227 to obtain 3D information regarding surroundings of the vehicle 100.

In operation S430, the vehicle 100 may identify a position thereof on a map corresponding to a current position thereof by obtaining 3D spatial information regarding structures around the vehicle 100 using the LiDAR unit 227 and mapping the 3D spatial information to 3D structure information contained in the map.

In operation S440, autonomous driving may be performed based on the identified position of the vehicle 100 on the map. Operations S430 and S440 may be described with reference to operations S230 and S240 of FIG. 2.

While driving through an alley, the vehicle 100 may periodically check whether there is a lane or a road surface sign that may be referred to for a road surface in a driving route, based on the map. When it is determined that there is a lane or a road surface sign that may be referred to for a road surface in the driving route, the vehicle 100 may identify the current position thereof using the camera in the vicinity of the lane or road surface sign.

Figure 5A:
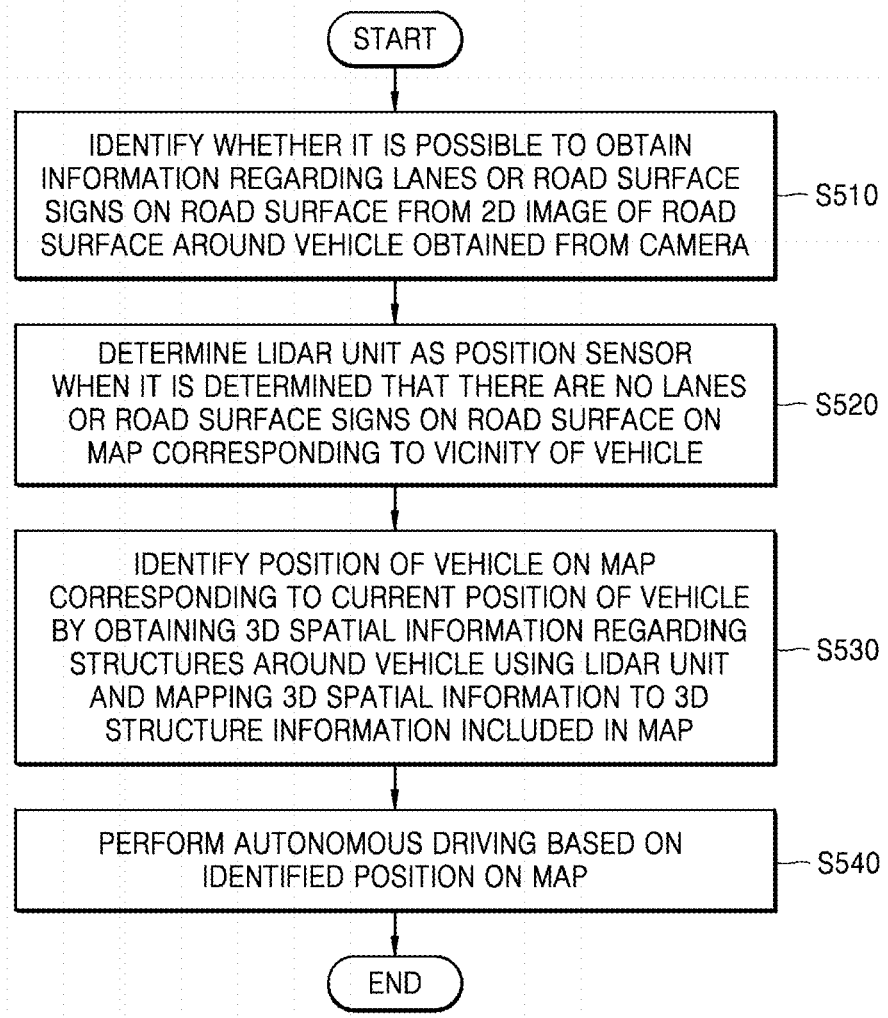
FIG. 5A is a flowchart illustrating an example method of identifying a position of a vehicle when information regarding lanes or a road surface cannot be obtained from a road surface on a map, the method being performed by the vehicle, according to another example embodiment of the disclosure.
Figure 5B:
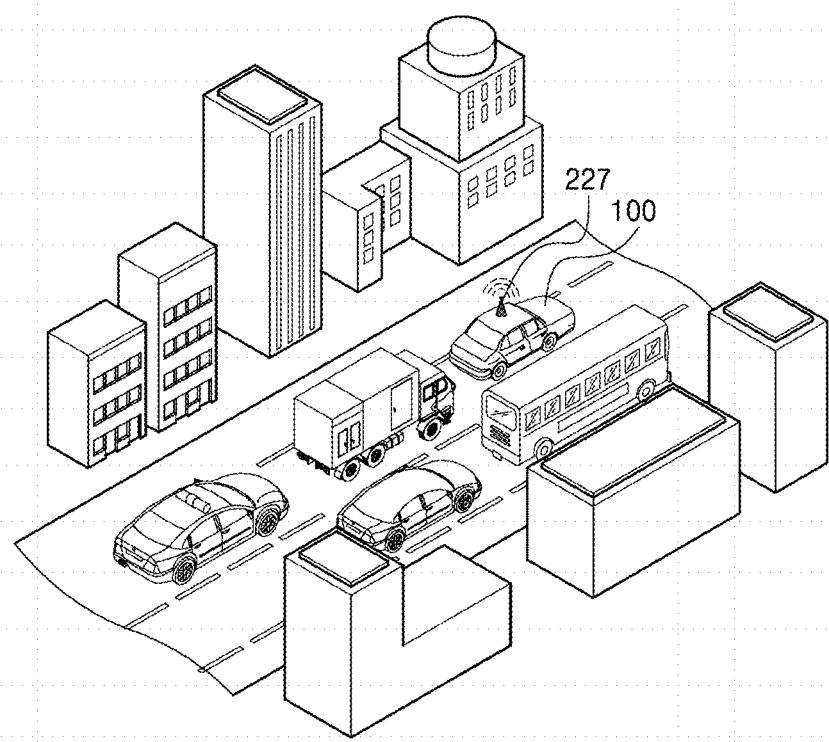
FIG. 5B is a diagram illustrating an example method of identifying a position of a vehicle when information regarding lanes or a road surface cannot be obtained from a road surface on a map, the method being performed by the vehicle, according to another example embodiment of the disclosure.

FIGS. 5A and 5B are a flowchart and diagram, respectively, illustrating an example method of identifying a position of a vehicle 100 when information regarding lanes or road surfaces cannot be obtained from a road surface on a map, the method being performed by the vehicle 100, according to another example embodiment of the disclosure.

In operation S510, the vehicle 100 may identify whether it is possible to obtain information regarding lanes or a road surface sign on a road surface from a 2D image of a road surface around the vehicle 100 which is obtained from the camera.

The vehicle 100 may obtain information regarding lanes or a road surface sign on the road surface around the vehicle 100, based on a map. The vehicle 100 may identify whether it is possible to detect lanes or a road surface sign from the obtained 2D image, when it is determined that there are lanes or a road surface sign on an actual road surface around the vehicle 100.

The vehicle 100 may identify whether it is possible to obtain information regarding lanes or a road surface sign displayed on a road surface from the 2D image without referring to a map, based on whether it is possible to detect previously stored feature points of lanes or road surface signs from the obtained 2D image.

The vehicle 100 may not be capable of obtaining information regarding lanes or a road surface sign from the 2D image, when lanes or a road surface sign is displayed on an actual road surface but there are many other vehicles 100 around the vehicle 100, the lanes or road surface sign is hidden, for example, by snow, rain, a shadow, the intensity of ambient illumination is low, or the like.

For example, referring to FIG. 5B, when lanes or a road surface sign on a road surface is hidden due to a large number of other vehicles 100 around the vehicle 100, the lanes or the road surface sign may not be included in a 2D image obtained from the camera.

In operation S520, the vehicle 100 may determine the LiDAR unit as a position sensor when it is determined that there are no lanes or road surface sign on a road surface on a map corresponding to the vicinity of the vehicle 100.

The vehicle 100 may determine a LiDAR unit 227 as a position sensor, when a map represents that lanes or a road surface sign is displayed on a road surface around the vehicle 100 but cannot be photographed.

In operation S530, the vehicle 100 may identify a position thereof on the map corresponding to a current position thereof by obtaining 3D spatial information regarding structures around the vehicle 100 by the LiDAR unit and mapping the 3D spatial information to 3D structure information included in the map.

In operation S540, the vehicle 100 may perform autonomous driving based on the identified position thereof on the map.

Figure 6A:
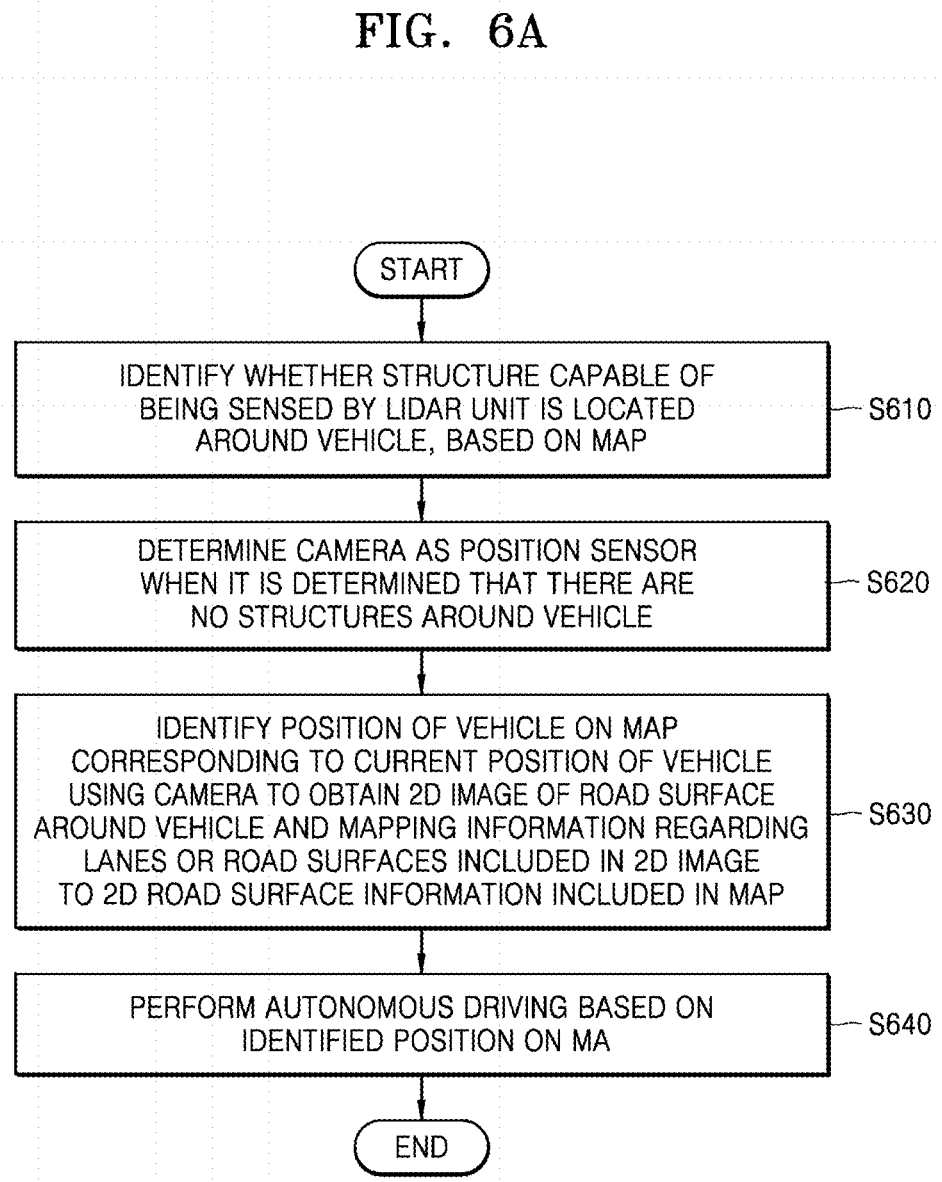
FIG. 6A is a flowchart illustrating an example method of identifying a position of a vehicle when information regarding structures near the vehicle cannot be obtained, the method being performed by the vehicle, according to an example embodiment of the disclosure.
Figure 6B:
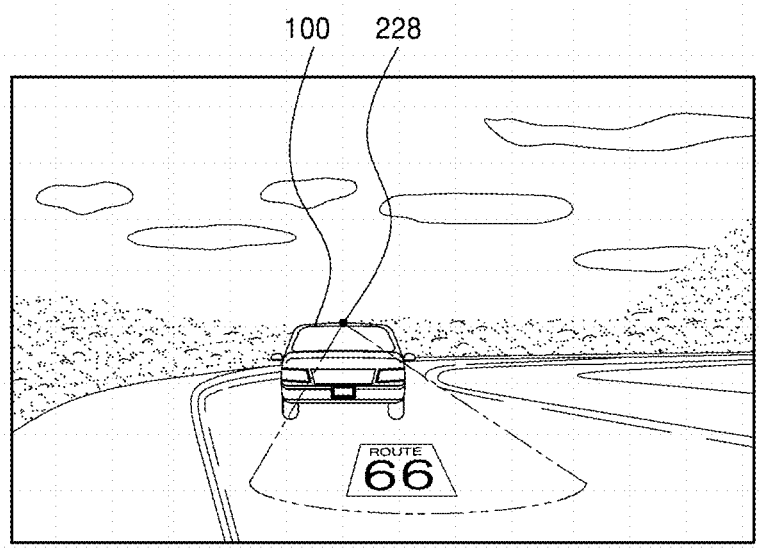
FIG. 6B is a diagram illustrating an example method of identifying a position of a vehicle when information regarding structures near the vehicle cannot be obtained, the method being performed by the vehicle, according to an example embodiment of the disclosure.

FIGS. 6A and 6B are a flowchart and diagram, respectively, illustrating an example method of identifying a position of a vehicle 100 when information regarding structures around the vehicle cannot be obtained, the method being performed by the vehicle 100, according to an example embodiment of the disclosure.

In operation S610, the vehicle 100 may identify whether a structure capable of being sensed by a LiDAR unit is located around the vehicle 100, based on a map.

When the LiDAR unit is set as a default position sensor, the vehicle 100 may identify a current position thereof by the LiDAR unit. The vehicle 100 may identify whether there is a structure around the vehicle 100 or in a moving path of the vehicle 100 using the LiDAR unit during the identification of the current position thereof, based on the map For example, referring to FIG. 6B, when the vehicle 100 is driving through, for example, a plain area or a desert area in which there are no structures, structures capable of being sensed by the LiDAR unit may not be located around the vehicle 100.

In operation S620, the vehicle 100 may determine a camera 228 as a position sensor when it is determined that there are no structures around the vehicle 100.

In operation S630, the vehicle 100 may identify a position thereof on the map corresponding to a current position thereof by obtaining a 2D image of a road surface around the vehicle 100 using the camera 228 and mapping information regarding lanes or road surfaces included in the 2D image to 2D road surface information included in the map.

In operation S640, the vehicle 100 may perform autonomous driving based on the identified position thereof on the map.

Figure 7A:
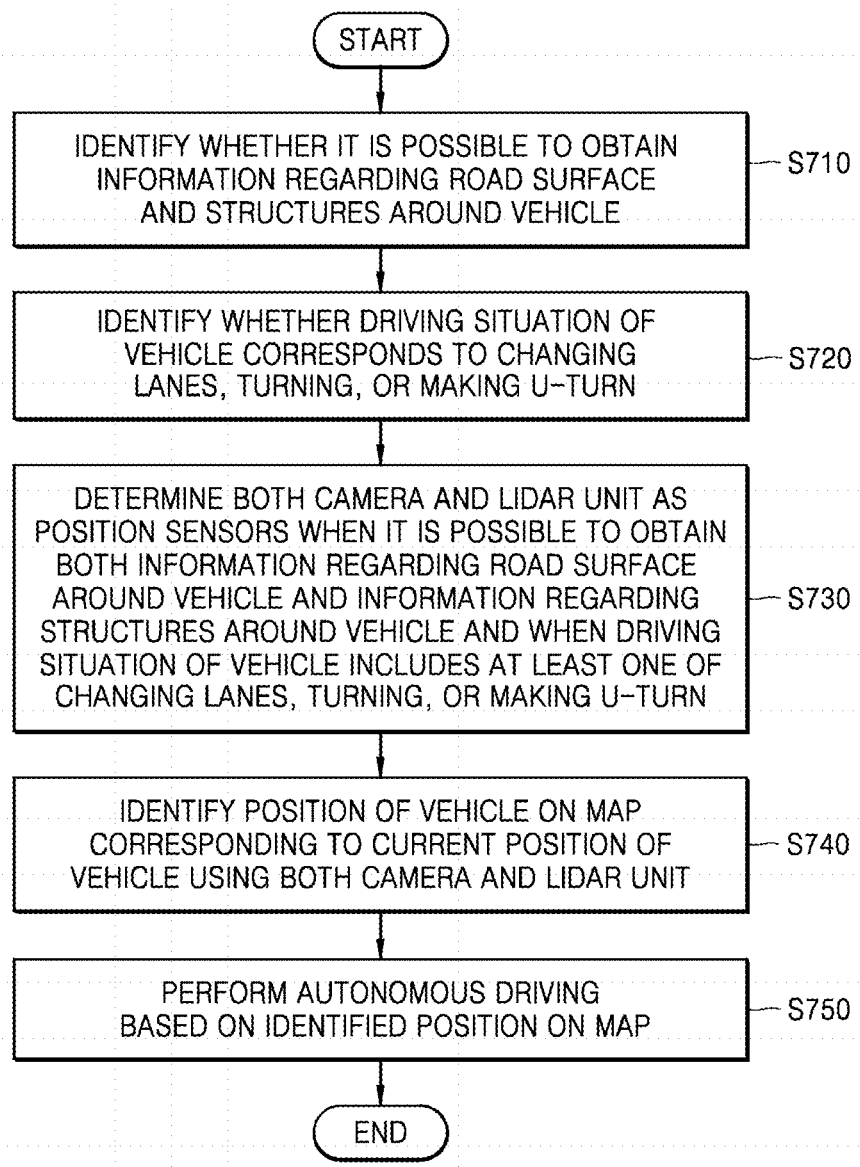
FIG. 7A is a flowchart illustrating an example method of identifying a position of a vehicle using a camera and a LiDAR unit according to a predetermined condition, the method being performed by the vehicle, according to an example embodiment of the disclosure.
Figure 7B:
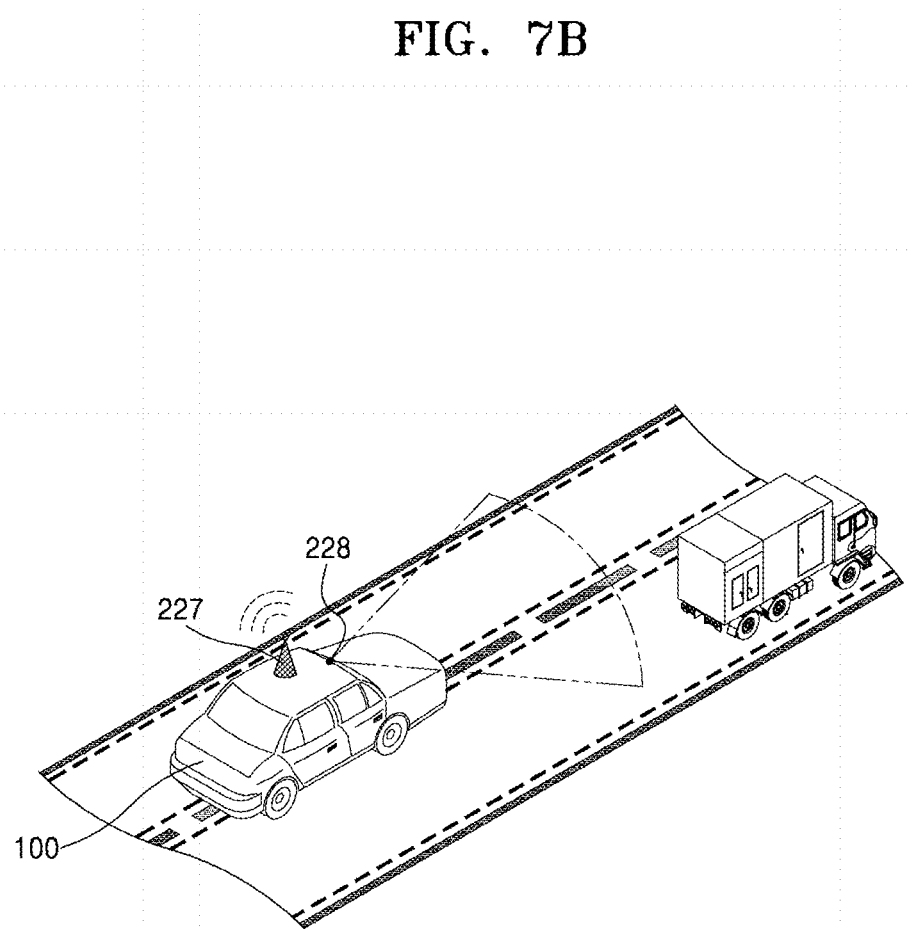
FIG. 7B is a diagram illustrating an example method of identifying a position of a vehicle using a camera and a LiDAR unit according to a predetermined condition, the method being performed by the vehicle, according to an example embodiment of the disclosure.

FIGS. 7A and 7B are a flowchart and diagram, respectively, illustrating an example method of identifying a position of a vehicle 100 using a camera and a LiDAR unit according to a predetermined condition, the method being performed by the vehicle 100, according to an example embodiment of the disclosure.

In operation S710, the vehicle 100 may identify whether it is possible to obtain information regarding a road surface and structures around the vehicle 100.

The vehicle 100 may identify whether there are lanes or a road surface sign on a road surface around the vehicle 100 and whether there are structures around the vehicle 100, based on a map. The vehicle 100 may identify that it is possible to obtain information regarding a road surface and structures around the vehicle 100, when there are lanes or a road surface sign on the road surface of the vehicle 100 and when there are structures around the vehicle 100.

In operation S720, the vehicle 100 may identify whether a driving situation thereof corresponds to changing lanes, turning, or making a U-turn.

It may be determined whether the driving situation of the vehicle 100 corresponds to a predetermined situation. The predetermined situation may refer, for example, to a situation in which it is necessary to accurately identify a pose or position of the vehicle 100 in real time during movement of the vehicle 100.

For example, referring to FIG. 7B, the predetermined situation may include, but are not limited to, changing lanes, making a right turn, making a left turn, and making a U-turn. When the vehicle 100 is changing lanes or turning, the vehicle 100 is likely to be out of a moving path because the vehicle 100 does not move straight, and the position of the vehicle 100 need be quickly and accurately identified to change the position thereof within a short time, in consideration of a possibility of a collision with vehicles 100 around the vehicle 100. Thus, the position In operation S730, the vehicle 100 may determine both the camera and the LiDAR unit as position sensors, when it is possible to obtain both information regarding the road surface around the vehicle 100 and information regarding the structures around the vehicle 100 and when the driving situation of the vehicle 100 includes changing lanes, turning, or making a U-turn.

When both the information regarding the road surface around the vehicle 100 and the information regarding the structures around the vehicle 100 may be obtained and the driving situation of the vehicle 100 corresponds to the predetermined situation, the vehicle 100 may determine both a camera 228 and a LiDAR unit 227 as position sensors.

In operation S740, the vehicle 100 may identify a position thereof on a map corresponding to a current position thereof using both the camera and the LiDAR unit.

In operation S750, the vehicle 100 may perform autonomous driving based on the identified position thereof on the map.

Figure 8:
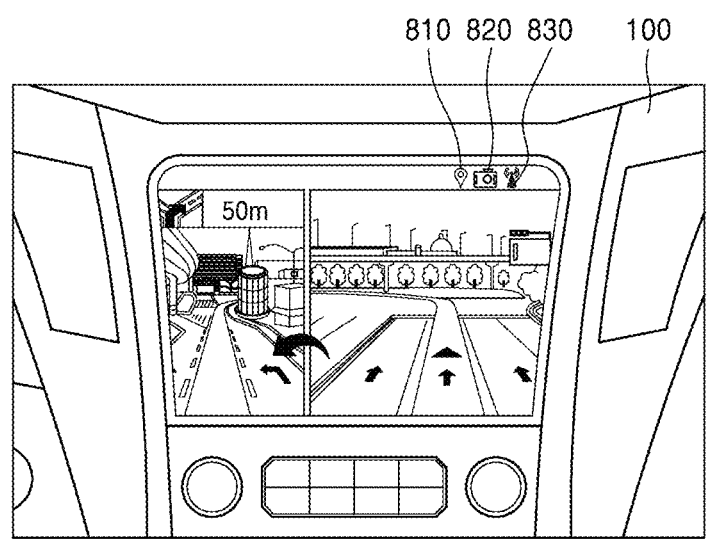
FIG. 8 is a diagram illustrating an example method of displaying identification information of a position sensor that is currently being used, the method being performed by a vehicle, according to an example embodiment of the disclosure.

FIG. 8 is a diagram illustrating an example method of displaying identification information of a position sensor that is currently being used, the method being performed by a vehicle 100, according to an example embodiment of the disclosure.

Referring to FIG. 8, the vehicle 100 may display identification information of a position sensor that is being currently used on a display screen.

For example, the vehicle 100 may display a GPS icon 810, a camera icon 820, and a LiDAR icon 830 on a navigation screen.

The vehicle 100 may display the position sensor that is being currently used on the display screen such that this position sensor is displayed in the form of an activated image and a position sensor that is not being currently used is displayed in the form of a deactivated image.

In addition, the vehicle 100 may display a user interface to receive a user input for selecting a position sensor. For example, upon receiving a user input for touching the LiDAR icon 830 that is deactivated, the vehicle 100 may activate the LiDAR unit.

Figure 9A:
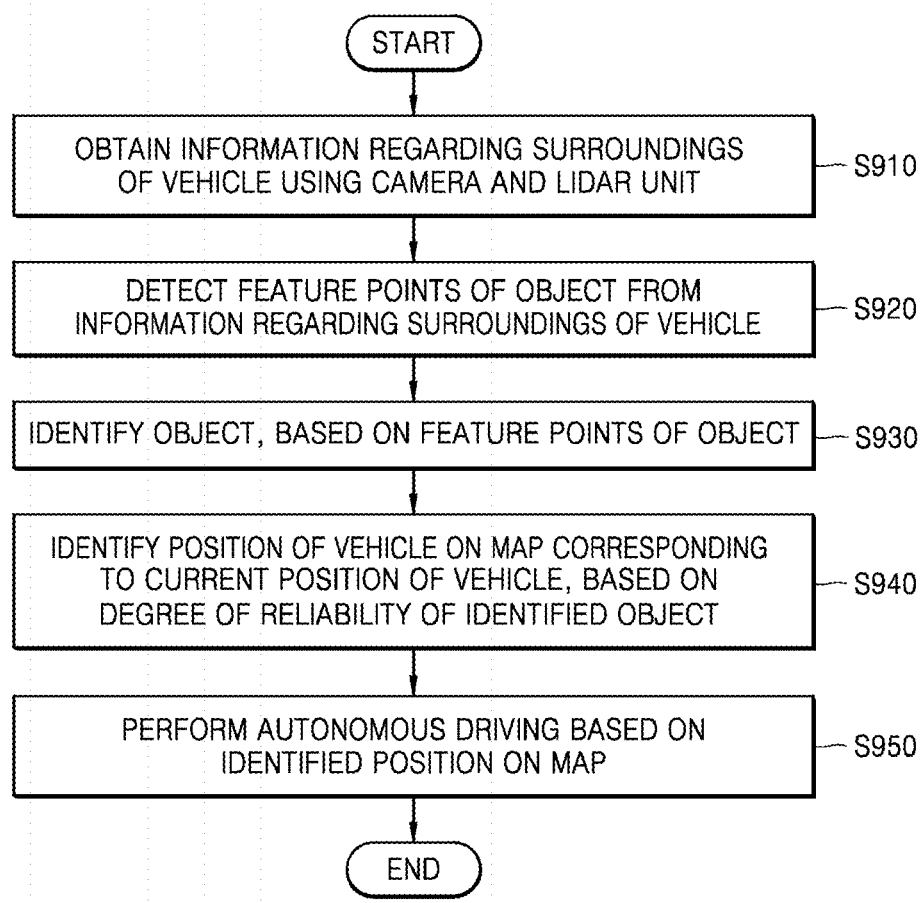
FIG. 9A is a flowchart illustrating an example method of identifying a position of a vehicle on a map, based on a reliability index of each object on the map, the method being performed by the vehicle, according to an example embodiment of the disclosure.
Figure 9B:
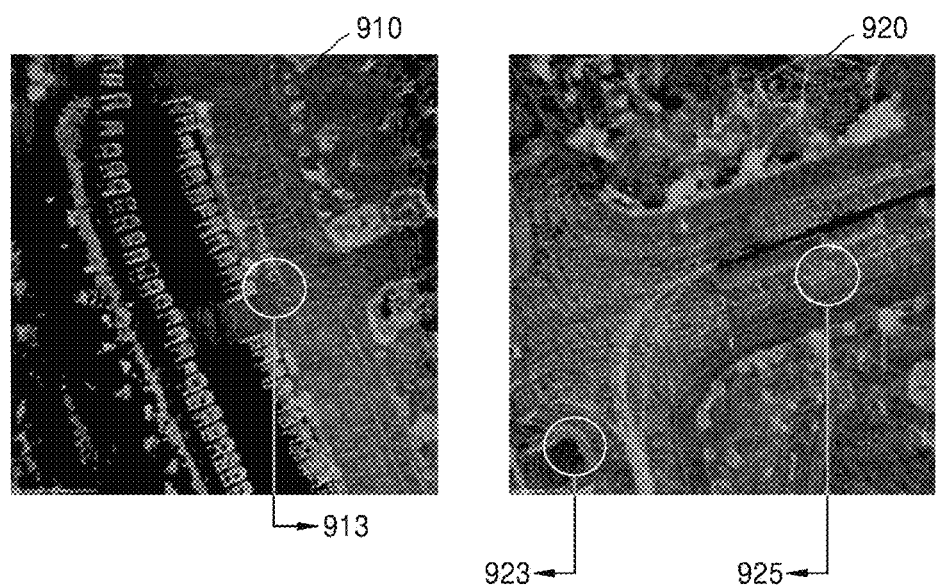
FIG. 9B is a diagram illustrating an example method of identifying a position of a vehicle on a map, based on a reliability index of each object on the map, the method being performed by the vehicle, according to an example embodiment of the disclosure.

FIGS. 9A and 9B are a flowchart and diagram, respectively, illustrating an example method of identifying a position of a vehicle 100 on a map, based on a reliability index of each object on the map, the method being performed by the vehicle 100, according to an example embodiment of the disclosure.

In operation S910, the vehicle 100 may obtain information regarding surroundings thereof by the camera and the LiDAR unit thereof.

The vehicle 100 may obtain a 2D image of surroundings thereof by the camera. Furthermore, the vehicle 100 may obtain 3D information regarding the surroundings thereof by the LiDAR unit.

In operation S920, the vehicle 100 may detect feature points of an object from the obtained information regarding the surroundings thereof.

The object may, for example, and without limitation, be a thing, part of the thing, information displayed on the thing, or the like. For example, the object may include the corners of a building, a sign, lanes, the moving vehicle 100, the building, the windows of the building, a street tree, or a construction sign, but is not limited thereto.

The feature points of the object may be determined in advance to correspond to the object. For example, feature points of the corners of a building, feature points of a sign, feature points of the windows of the building, and feature points of a construction sign may be stored in advance to correspond to these objects.

In operation S930, the vehicle 100 may identify the object, based on the feature points of the object.

For example, the vehicle 100 may identify the presence of a building and the positions of the corners of the building by detecting characteristics of the corners of the building from 3D information obtained by the LiDAR unit. Furthermore, the vehicle 100 may identify the presence of lanes and the positions of the lanes by detecting feature points of the lanes from a 2D image obtained by the camera.

In operation S940, the vehicle 100 may identify a position thereof on a map corresponding to a current position thereof, based on a degree of reliability of the identified object.

The vehicle 100 may store a map in which a degree of reliability of each object is determined. The degree of reliability may be understood to refer, for example, to a degree to which each object is reliable to identify the position of the vehicle 100 on the map, and may include a possibility of a change of each object, a possibility of specifying feature points of each object.

For example, a degree of reliability of an object may be reduced as the object is easier to change, feature points of the object are more difficult to specify, the object appears repeatedly within a reference distance or less, or the like. For example, when a degree of reliability is expressed with a number from 0 to 1, the corners of building may be very unlikely to be changed and a degree of reliability thereof may thus be set to 0.99, a sign is unlikely to be changed and a degree of reliability thereof may thus be set to 0.9, a lane is unlikely to be changed but a degree of reliability thereof may be set to 0.8 due to the repetitive appearance thereof in a horizontal direction, a window of the building is unlikely to be changed but a degree of reliability thereof may be set to 0.7 due to the repetitive appearance thereof, a degree of reliability of a street tree may be set to 0.5 due to unclear feature points of the street tree, a construction sign is highly likely to be changed and a degree of reliability thereof may be set to 0.3, and a degree of reliability of a moving vehicle may be set to 0. The degree of reliability of each object may be determined during creation of the map and is not limited to the above examples.

In case of an object with low reliability, even where the object is identified from information regarding surroundings of the vehicle 100, the object may not be considered when a position of the vehicle 100 on the map is identified or a weight of the object may be reduced. In case of an object with high reliability, a weight of the object may be increased when the position of the vehicle 100 on the map is identified.

For example, referring to FIG. 9B, the vehicle 100 may store 3D maps 910 and 920. The vehicle 100 may detect feature points of a lane 913 from 3D information obtained by the LiDAR unit. Furthermore, the vehicle 100 may detect feature points of a moving vehicle 925 from the 3D information obtained by the LiDAR unit. In addition, the vehicle 100 may detect feature points of a corner 923 of a building from the 3D information obtained by the LiDAR unit.

When a degree of reliability of the lane 913 is 0.8, a degree of reliability of the corner 923 of the building is 0.99, and a degree of reliability of the moving vehicle 925 is 0, the vehicle 100 may identify a position thereof on the map by adding a weight of 0.99 to the corner 923 of the building, a weight of 0.8 to the lane 913, and a weight of 0 to the moving vehicle 925.

In operation S950, the vehicle 100 may perform autonomous driving based on the identified position thereof on the map.

Figure 10:
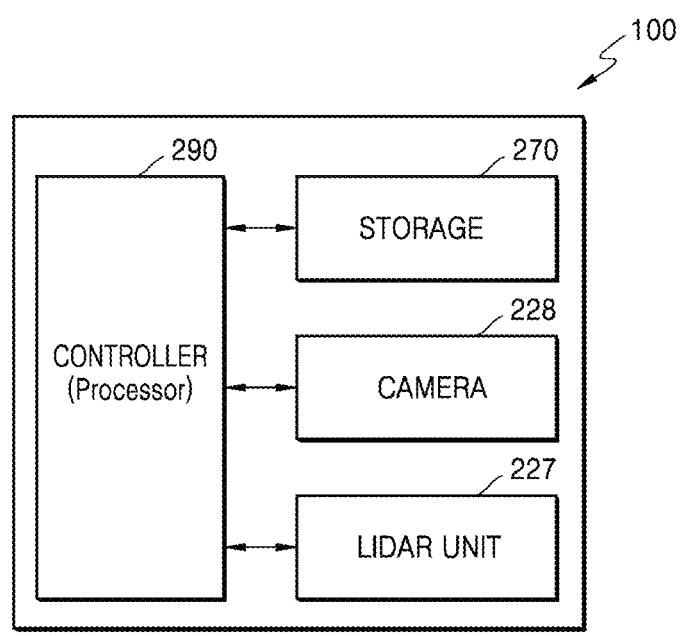
FIG. 10 is a block diagram illustrating an example vehicle according to an example embodiment of the disclosure.

FIG. 10 is a block diagram illustrating an example vehicle 100 according to an example embodiment of the disclosure In an example embodiment of the disclosure, the vehicle 100 may include a controller (e.g., including processing circuitry) 290, a storage 270, a LiDAR unit (e.g., including LiDAR circuitry) 227, and a camera 228. However, all the components illustrated in FIG. 10 are not indispensable components of the vehicle 100. The vehicle 100 may be configured with other components, as well as the components of FIG. 10, or may be configured with only some of the components of FIG. 10.

For example, in an example embodiment of the disclosure, the vehicle 100 may include only the controller 290, the storage 270 and the LiDAR unit 227 or may include only the controller 290, the storage 270 and the camera 228.

Generally, the controller 290 may include various processing circuitry and controls overall operations of the vehicle 100. For example, the controller 290 may execute programs stored in the storage 270 for overall control of the storage 270, the LiDAR unit 227, and the camera 228. The controller 290 may control operations of the vehicle 100 to perform the functions of the vehicle 100 described above with reference to FIGS. 1 to 9B.

The storage 270 may store data for driving of the vehicle 100. For example, the storage 270 may store a navigation map for autonomous driving. The storage 270 may include, for example, and without limitation, at least one type of storage medium among a flash memory type, a hard disk type, a multimedia card micro type, a card type memory (e.g., an SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disc.

The storage 270 may store a map including two-dimensionally represented road surface information and three-dimensionally represented structure information.

The camera 228 may obtain 2D image of a road surface around the vehicle 100.

The LiDAR unit 227 may obtain 3D spatial information regarding structures around the vehicle 100.

The controller 290 may determine at least one of the camera 228 or the LiDAR unit 227 as a position sensor, based on whether it is possible to obtain information regarding the road surface or the structures around the vehicle 100, identify a position of the vehicle 100 on a map corresponding to a current position of the vehicle 100 using the position sensor, and perform autonomous driving based on the identified position of the vehicle 100 on the map.

Furthermore, when the camera 228 is determined as a position sensor, the controller 290 may identify the position of the vehicle 100 on the map corresponding to the current position of the vehicle 100 by obtaining a 2D image of the road surface around the vehicle 100 using the camera 228, and mapping information regarding lanes or road surfaces included in the 2D image to 2D road surface information included in the map.

When the LiDAR unit 227 is determined as a position sensor, the controller 290 may identify the position of the vehicle 100 on the map corresponding to the current position of the vehicle 100 by obtaining 3D spatial information regarding the structures around the vehicle 100 using the LiDAR unit 227 and mapping the 3D spatial information to 3D structure information included in the map.

The controller 290 may identify whether it is possible to obtain information regarding the road surface or structures around the vehicle 100 by identifying whether there are lanes or a road surface sign on a road surface around the vehicle 100 on the map or whether there are structures around the vehicle 100 on the map.

The controller 290 may identify whether it is possible to obtain information regarding the road surface around the vehicle 100 by identifying whether it is possible to obtain information regarding lanes or a road surface sign displayed on the road surface from a 2D image regarding the road surface around the vehicle 100 obtained by the camera 228.

The controller 290 may determine the LiDAR unit 227 as a position sensor when it is determined that there are no lanes or road surface sign on the road surface around the vehicle 100 on the map.

The controller 290 may determine the LiDAR unit 227 as a position sensor when it is determined that the information regarding the lanes or road surface sign on the road surface cannot be obtained from the 2D image.

The controller 290 may identify whether structures capable of being sensed by the LiDAR unit 227 are located around the vehicle 100, based on the map, and determine the camera 228 as a position sensor when it is determined that there is no structure around the vehicle 100.

In addition, the controller 290 may determine both the camera 228 and the LiDAR unit 227 as position sensors, when it is possible to obtain both information regarding the road surface around the vehicle 100 and information regarding the structures around the vehicle 100 and when a driving situation of the vehicle 100 includes at least one of changing lanes, turning, or making a U-turn.

The map may be a map in which a reliability index representing a degree of reliability is determined for each object included in the map, and the controller 290 may identify a position of the vehicle 100 on the map corresponding to a current position of the vehicle 100, based on the reliability index of each object.

Figure 11:
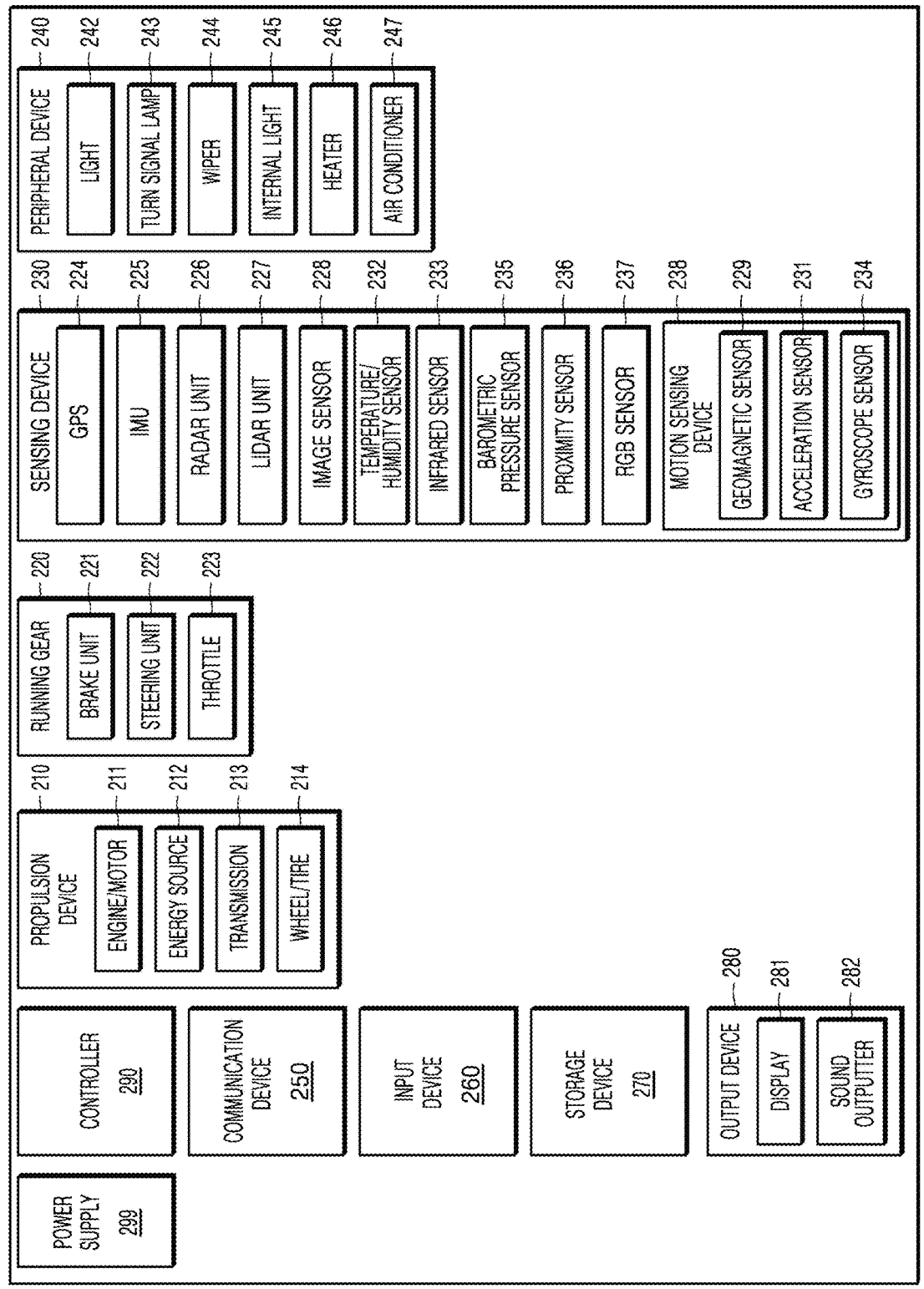
FIG. 11 is a block diagram illustrating an example vehicle according to another example embodiment of the disclosure.

FIG. 11 is a block diagram illustrating an example vehicle 100 according to another example embodiment of the disclosure.

In an example embodiment of the disclosure, the vehicle 100 may be an autonomous vehicle.

The vehicle 100 may include a propulsion device 210, a power supply 299, a communication device (e.g., including communication circuitry) 250, an input device (e.g., including input circuitry) 260, an output device (e.g., including output circuitry) 280, a storage device 270, running gear 220, a sensing device (e.g., including sensing circuitry and/or sensors) 230, a peripheral device 240, and a controller (e.g., including processing circuitry) 290. However, it will be apparent to those of ordinary skill in the art that the vehicle 100 may further include other general components, as well as the components illustrated in FIG. 11 or some of the components illustrated in FIG. 11 may be omitted.

The propulsion device 210 may include an engine/motor 211, an energy source 212, a transmission 213, and a wheel/tire 214.

The engine/motor 211 may include, for example, and without limitation, any combination of an internal combustion engine, an electric motor, a steam engine, a stirling engine, or the like. For example, when the vehicle 100 is a gas-electric hybrid car, the engine/motor 211 may include a gasoline engine and an electric motor.

The energy source 212 may be an energy source supplying power in whole or in part to the engine/motor 211. For example, the engine/motor 211 may be configured to convert the energy source 212 into mechanical energy. Examples of the energy source 212 may include, for example, and without limitation, at least one of gasoline, diesel, propane, other compressed gas-based fuels, ethanol, a solar panel, a battery, other electrical power sources, or the like. The energy source 212 may include, for example, and without limitation, at least one of a fuel tank, a battery, a capacitor, a flywheel, or the like. The energy source 212 may provide energy to the system of and devices of the vehicle 100.

The transmission 213 may be configured to transmit mechanical power from the engine/motor 211 to the wheel/tire 214. For example, the transmission 213 may include, for example, and without limitation, at least one of a gear box, a clutch, a differential gear, a drive shaft, or the like. When the transmission 213 includes drive shafts, the drive shafts may include one or more axles configured to be combined with the wheel/tire 214.

The wheel/tire 214 may be configured in various formats, including, for example, and without limitation, a unicycle, a bicycle/motorbike, a tricycle, a four-wheel form of a car/truck, or the like. For example, the wheel/tire 214 may be configured in other wheel/tire formats, such as those having six or more wheels. The wheel/tire 214 may include at least one wheel fixedly attached to the transmission 213, and at least one tire coupled to a rim of a wheel configured to be in contact with a driving surface.

The running gear 220 may include a brake unit 221, a steering unit 222, and a throttle 223.

The steering unit 222 may include a combination of mechanisms configured to adjust the orientation of the vehicle 100.

The throttle 223 may include a combination of mechanisms configured to control an operation speed of the engine/motor 211 to control the speed of the vehicle 100. An amount of an air-fuel mixture flowing into the engine/motor 211, and power and thrust may be controlled by adjusting a degree of opening the throttle 223.

The brake unit 221 may include a combination of mechanisms configured to decelerate the vehicle 100. For example, the brake unit 221 may use friction to reduce the speed of the wheel/tire 214.

The sensing device 230 may include various sensing circuitry including a plurality of sensors configured to sense information regarding an environment in which the vehicle 100 is located, and/or one or more actuators configured to change a position and/or orientation of the plurality of sensors. For example, the sensing device 230 may include a GPS 224, an IMU 225, a RADAR unit 226, a LiDAR unit 227, and an image sensor 228. The sensing device 230 may further include, but is not limited to, at least one of a temperature/humidity sensor 232, an infrared sensor 233, a barometric pressure sensor 235, a proximity sensor 236, an RGB sensor (illuminance sensor) 237. The functions of these sensors may be intuitively deduced from the names thereof by those of ordinary skill in the art and thus a detailed description thereof will be omitted here.

The sensing device 230 may further include a motion sensing device 238 to sense a motion of the vehicle 100. The motion sensing device 238 may include a geomagnetic sensor 229, an acceleration sensor 231, and/or a gyroscope sensor 234.

The GPS 224 may be a sensor configured to estimate a geographic location of the vehicle 100. That is, the GPS 224 may include a transceiver configured to estimate a position of the vehicle 100 relative to the earth.

The IMU 225 may include a combination of sensors configured to sense a change of a position and orientation of the vehicle 100 and orientation changes, based on inertial acceleration. For example, the combination of sensors may include accelerometers and gyroscopes.

The RADAR unit 226 may be a sensor configured to sense objects in an environment in which the vehicle 100 is located using a radio signal. The RADAR unit 226 may also be configured to sense the speed and/or orientation of the objects.

The LiDAR unit 227 may be a sensor configured to sense objects in an environment in which the vehicle 100 is located using laser. In detail, the LiDAR unit 227 may include a laser light source and/or a laser scanner configured to emit laser beams, and a detector configured to detect reflection of laser beams. The LiDAR unit 227 may be configured to be operated in a coherent detection mode (e.g., using heterodyne detection) or in an incoherent detection mode.

The image sensor 228 may be a still camera or a video camera configured to record images inside and outside the vehicle 100. For example, the image sensor 228 may include a plurality of cameras, and the plurality of cameras may be provided on a plurality of locations inside and outside the vehicle 100.

The peripheral device 240 may include a light 242, a turn signal lamp 243, a wiper 244, an internal light 245, a heater 246, and an air conditioner 247.

The storage device 270 may include, for example, and without limitation, a magnetic disk drive, an optical disk drive, a flash memory, or the like. The storage device 270 may be a portable USB data storage device. The storage device 270 may store system software for implementing examples related to the disclosure. The system software for implementing the examples related to the disclosure may be stored in a portable storage medium.

The communication device 250 may include various communication circuitry including, for example, at least one antenna to wirelessly communicate with another device. For example, the communication device 250 may be used to wirelessly communicate with a cellular network or other wireless protocols and a system via Wi-Fi or Bluetooth. The communication device 250 controlled by the controller 290 may transmit and/or receive radio signals. For example, the controller 290 may execute a program stored in the storage device 270 so that the communication device 250 may transmit a radio signal to receive a radio signal from a cellular.

The input device 260 may include various input circuitry for inputting data to control the vehicle 100. Examples of the input device 260 may include, but are not limited to, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, a piezo effect-type touch pad, or the like), a jog wheel, a jog switch, etc. The input device 260 may include a microphone, and the microphone may be configured to receive an audio signal (e.g., a voice command) from a person who is getting in the vehicle 100.

The output device 280 may include various output circuitry to output an audio signal or a video signal, and include a display 281 and a sound outputter 282.

The display 281 may include, for example, and without limitation, at least one of a liquid crystal display, a thin-film-transistor-liquid crystal display, an organic light-emitting diode, a flexible display, a 3D display, an electrophoretic display, or the like. The output device 280 may include two or more displays 281 according to a type thereof.

The sound outputter 282 may include various output circuitry and outputs audio data received from the communication device 250 or stored in the storage device 270. The sound outputter 282 may include, for example, and without limitation, a speaker, a buzzer, etc.

Each of the input device 260 and the output device 280 may include a network interface and may be embodied as a touch screen.

Generally, the controller 290 may include various processing circuitry and controls overall operations of the vehicle 100. For example, the controller 290 may execute the programs stored in the storage device for overall control of the propulsion device 210, the running gear 220, the sensing device 230, the peripheral device 240, the communication device 250, the input device 260, the storage device 270, the output device 280, and the power supply 299. Furthermore, the controller 290 may control a motion of the vehicle 100.

In addition, the controller 290 may control autonomous driving of the vehicle 100, based on sensed data and a precision map.

The power supply 299 may be configured to supply power to some or all of the components of the vehicle 100. For example, the power supply 299 may include a rechargeable lithium ion or lead-acid battery.

Various example embodiments of the disclosure may be embodied in the form of a recording medium storing instructions, such as computer-executable program modules, which are executable by a computer. Such computer-readable recording media may be any available media that are accessible by a computer, and include all a volatile medium, a nonvolatile medium, a separable medium, and a non-separable medium. Such computer-readable recording media may also include both a computer storage medium and a communication medium. Examples of the computer storage medium include all of a volatile medium, a nonvolatile medium, a separable medium, and a non-separable medium which are implemented by any method or technology for storing information, such as computer-readable instructions, data structures, program modules or other data. Examples of the communication medium include computer-readable instructions, data structures, program modules, other data of a modulated data signal, or other transport mechanisms, and include any information transport media.

As used herein, the term "unit" may refer, for example, to a hardware component such as a processor, a circuit, and/or a software component executed by a hardware component such as a processor.

The above description of the disclosure is merely intended to provide examples, and it will be apparent to those of ordinary skill in the art that various modifications and changes may be made therein without departing from the spirit or scope of the disclosure. Therefore, the embodiments set forth herein should be considered in a descriptive sense only and not for purposes of limitation. For example, each component described as a single entity may be distributed and implemented, and components described as distributed may also be implemented in a combined form.

What is claimed is:

1. An autonomous vehicle comprising:
a storage configured to store a map including two-dimensionally represented road surface information and three-dimensionally represented structure information;
a camera configured to obtain a two-dimensional (2D) image of a road surface in a vicinity of the vehicle;
a light detection and ranging (LiDAR) unit comprising light detection and ranging circuitry configured to obtain three-dimensional (3D) spatial information regarding structures in the vicinity of the vehicle; and
a controller comprising processing circuitry configured to:
identify a position of the vehicle on the map corresponding to a current position of the vehicle by obtaining the 2D image of the road surface in the vicinity of the vehicle using the camera and mapping information regarding lanes and/or a road surface included in the 2D image to the two-dimensionally represented road surface information included in the map;
determine the LiDAR unit as a position sensor based on determining that there are no lanes and/or road surface signs on a road surface on the map corresponding to the vicinity of the vehicle based on the two-dimensionally represented road surface information of the map;
in response to the LiDAR unit being determined as the position sensor, identify the position of the vehicle on the map corresponding to the current position of the vehicle by obtaining the 3D spatial information regarding the structures in the vicinity of the vehicle using the LiDAR unit and mapping the 3D spatial information to the three-dimensionally represented structure information included in the map; and
perform autonomous driving based on the identified position on the map.

2. The autonomous vehicle of claim 1, wherein the controller is further configured to determine whether it is possible to obtain information regarding the road surface and/or the structures around the vehicle by determining whether there are lanes and/or road surface signs on a road surface in the vicinity of the vehicle on the map and/or whether there are structures in the vicinity of the vehicle on the map.

3. The autonomous vehicle of claim 1, wherein the controller is further configured to determine whether it is possible to obtain information regarding the road surface in the vicinity of the vehicle by determining whether it is possible to obtain information regarding lanes and/or road surface signs on the road surface from the 2D image of the road surface in the vicinity of the vehicle obtained by the camera.

4. The autonomous vehicle of claim 1, wherein the controller is further configured to determine the LiDAR unit as a position sensor, based on determining that it is not possible to obtain information regarding lanes and/or road surface signs on the road surface from the 2D image.

5. The autonomous vehicle of claim 1, wherein the controller is further configured to determine whether structures capable of being sensed by the LiDAR unit are located in the vicinity of the vehicle, based on the map, and to determine the camera as a position sensor based on determining that there are no structures in the vicinity of the vehicle.

6. The autonomous vehicle of claim 1, wherein the controller is further configured to determine both the camera and the LiDAR unit as position sensors, based on it being possible to obtain both information regarding the road surface in the vicinity of the vehicle and information regarding the structures in the vicinity of the vehicle and based on a driving situation of the vehicle including at least one of changing lanes, turning, or making a U-turn.

7. The autonomous vehicle of claim 1, wherein the map comprises a map including information regarding a reliability index representing a degree of reliability of each object in the map, and the controller is further configured to identify the position of the vehicle on the map corresponding to the current position of the vehicle based on the reliability index of each object in the map.

8. An autonomous driving method comprising:
storing a map including two-dimensionally represented road surface information and three-dimensionally represented structure information;
identifying a position of a vehicle on the map corresponding to a current position of the vehicle by obtaining a two-dimensional (2D) image of the road surface in vicinity of the vehicle using a camera and mapping information regarding lanes and/or a road surface included in the 2D image to the two-dimensionally represented road surface information included in the map;
determining a LiDAR unit as a position sensor based on determining that there are no lanes and/or road surface signs on a road surface on the map corresponding to the vicinity of the vehicle based on the two-dimensionally represented road surface information of the map;
in response to the LiDAR unit being determined as the position sensor, identifying the position of the vehicle on the map corresponding to the current position of the vehicle by obtaining three-dimensional (3D) spatial information regarding the structures in the vicinity of the vehicle using the LiDAR unit and mapping the 3D spatial information to the three-dimensionally represented structure information included in the map; and
performing autonomous driving based on the identified position on the map.

9. The autonomous driving method of claim 8, further comprising determining whether it is possible to obtain the information regarding the road surface and/or the structures in the vicinity of the vehicle by determining whether there are lanes and/or road surface signs on a road surface in the vicinity of the vehicle on the map and/or whether there are structures in the vicinity of the vehicle on the map.

10. The autonomous driving method of claim 8, further comprising determining whether it is possible to obtain the information regarding the road surface in the vicinity of the vehicle by determining whether it is possible to obtain information regarding lanes and/or road surface signs on the road surface from the 2D image of the road surface in the vicinity of the vehicle obtained by the camera.

11. The autonomous driving method of claim 8, further comprising determining the LiDAR unit as a position sensor, based on it being determined that there are no lanes and/or road surface signs on a road surface on the map corresponding to the vicinity of the vehicle.

12. The autonomous driving method of claim 8, further comprising determining the LiDAR unit as the position sensor, based on it being determined that obtaining information regarding lanes and/or road surface signs on the road surface from the 2D image is not possible.

13. The autonomous driving method of claim 8, further comprising determining whether structures capable of being sensed by the LiDAR unit are located in the vicinity of the vehicle, based on the map, and determining the camera as a position sensor based on it being determined that there are no structures in the vicinity of the vehicle.

14. The autonomous driving method of claim 8, further comprising determining both the camera and the LiDAR unit as position sensors, based on it being possible to obtain both information regarding the road surface in the vicinity of the vehicle and information regarding the structures in the vicinity of the vehicle and based on a driving situation of the vehicle including at least one of changing lanes, turning, or making a U-turn.

15. The autonomous driving method of claim 8, wherein the map comprises a map including information regarding a reliability index representing a degree of reliability of each object in the map, and the method further comprises identifying the position of the vehicle on the map corresponding to the current position of the vehicle based on the reliability index of each object in the map.

* * * * *